(12) United States Patent
Kitazawa et al.

(10) Patent No.: US 7,010,408 B2
(45) Date of Patent: Mar. 7, 2006

(54) ACCELERATOR CONTROLLER

(75) Inventors: Keiichi Kitazawa, Tokyo (JP);
Hirofumi Yasui, Tokyo (JP)

(73) Assignee: Hino Jidousha Kabushiki Kaisha, Tokyo (JP)

( * ) Notice: Subject to any disclaimer, the term of this patent is extended or adjusted under 35 U.S.C. 154(b) by 157 days.

(21) Appl. No.: 10/616,231

(22) Filed: Jul. 10, 2003

(65) Prior Publication Data

US 2004/0128057 A1    Jul. 1, 2004

(30) Foreign Application Priority Data

Jul. 17, 2002 (JP) .............................. 2002-208701

(51) Int. Cl.
*B60K 31/04* (2006.01)

(52) U.S. Cl. .......................................... 701/70; 701/93

(58) Field of Classification Search .................. 701/70, 701/93; 123/349, 350
See application file for complete search history.

(56) References Cited

U.S. PATENT DOCUMENTS

| 4,408,293 | A  | * | 10/1983 | Avins .......................... 701/93 |
| 5,532,929 | A  |   | 7/1996  | Hattori et al. |
| 6,078,860 | A  | * | 6/2000  | Kerns .......................... 701/93 |
| 6,304,809 | B1 | * | 10/2001 | Cullen et al. .................. 701/93 |
| 6,330,506 | B1 |   | 12/2001 | Roulet |

FOREIGN PATENT DOCUMENTS

JP        2000-43611 A     2/2000

* cited by examiner

*Primary Examiner*—Michael J. Zanelli
(74) *Attorney, Agent, or Firm*—Pillsbury Winthrop Shaw Pittman LLP (57) ABSTRACT

Fuel consumption due to abrupt acceleration is reduced. An auto-cruising control is automatically started without intention of a driver and executes a control for gently and reasonably accelerating a vehicle even when an accelerator pedal is displaced abruptly. When a regular running state is detected, the auto-cruising control is started automatically. When the auto-cruising control is effective and the accelerator pedal is displaced substantially, fuel consumption is restricted by setting an aimed vehicle speed stepwise with small speed change, so that a large amount of fuel is not supplied.

19 Claims, 6 Drawing Sheets

ACCELERATOR CONTROLLER

BACKGROUND OF THE INVENTION

1. Field of the Invention

The present invention is utilized in an accelerator controller of an automobile equipped with an internal combustion engine. The present invention relates to a control system including a program control circuit provided in a circuit for converting an operating amount of an accelerator pedal operated by a driver into an electric signal and transmitting the electric signal to an actuator for controlling an accelerator opening of an engine. Although the accelerator controller of the present invention is developed for use in a vehicle equipped with a diesel engine, it can be generally applied to an engine utilizing liquid fuel. The present invention relates to an improvement of an auto-cruising device. The present invention relates to an improvement of fuel consumption rate and an improvement of exhaust gas.

2. Description of Related Art

Auto-cruising devices are popularly used in automobiles. Most of auto-cruising devices are automatic control devices each of which is made active when a driver of a vehicle manually operates an actuation switch, sets a vehicle speed at the time of the operation of the actuation switch as an aimed speed and automatically controls an accelerator opening of an engine of the vehicle such that a vehicle speed is continuously kept at the aimed speed. When the auto-cruising device is effectively operating, it is possible to run the vehicle at a certain constant speed even when the driver releases an accelerator pedal. Such auto-cruising device is widely utilized in long distance running or other running at a certain constant speed.

In such conventional auto-cruising device, the auto-cruising control can be made inactive when a driver turns the actuation switch off, steps a brake pedal or shifts down a transmission gear. Further, the auto-cruising device is usually constructed such that, when a driver steps the accelerator pedal abruptly in the state where the auto-cruising device is effectively operating, the vehicle can be accelerated overriding the control of the auto-cruising device. When the actuation switch for auto-cruising includes a switch for changing an aimed vehicle speed, it is possible to accelerate or decelerate the vehicle by changing the aimed speed by the aimed speed changing switch even when the driver releases the accelerator pedal.

In most of such conventional auto-cruising devices, when a driver changes the aimed vehicle speed while the auto-cruising device is operating effectively, acceleration or deceleration control is executed such that the vehicle speed becomes a new aimed speed smoothly. JP2000-043611A discloses a technique in which, in a case where an acceleration or deceleration control is performed when a driver changes an aimed vehicle speed, a control gain is changed correspondingly to a vehicle speed at the aimed speed changing time. The object and the effect of the invention disclosed in JP2000-043611A is to improve the controllability of a vehicle. That is, the technique disclosed therein utilizes a feed-back control or a feed-forward control such that, when an aimed speed in an automatic control is changed stepwise, the vehicle speed approaches a new aimed speed as smoothly as possible without overshooting or control delay.

In the conventional auto-cruising device, the control is started by the manual operation of the driver, as mentioned above. According to an investigation made by the inventors of this application, it has been found that there is no auto-cruising device in which a cruising control is started automatically without requiring any manual operation of a driver when a constant condition is established. Further, a driver utilizes the conventional auto-cruising device by basically releasing an accelerator pedal when the auto-cruising control is started. Although there is the technique for overriding the control after the control is started, a technical thought that a control function for controlling an accelerator of a vehicle engine is changed in any way according to a displacement amount of the accelerator pedal is not known so far.

On the other hand, an improvement of the fuel consumption rate (distance covered by unit amount of fuel) is highly requested by vehicle users. Particularly, for commercial vehicle such as truck or bus, the fuel consumption rate is a very important factor for user in selecting the kind of vehicle. Further, in order to solve the recent environmental contamination problem due to exhaust gas, a further reduction of sulfur content of fuel for diesel engine has been considered. In order to reduce sulfur content of fuel for diesel engine, an additional step for refining the fuel is required in the oil refining process, causing fuel cost to be increased. Therefore, it is anticipated that the improvement of fuel consumption rate of vehicle becomes more and more important.

In order to effectively improve the fuel consumption rate, the present inventors paid an attention to a sudden acceleration of vehicle among various traveling resistances occurring in a vehicle, which increases fuel consumption. That is, when the traveling resistance of vehicle is classified to air resistance, rolling friction of wheels, acceleration resistance and grade resistance, etc., and a quantitative distribution of these resistive components is considered, it is clear that the traveling resistance, which can be controlled according to the driving mode, is the acceleration resistance. In order to reduce an influence of the acceleration resistance, it is preferable that, when a new aimed speed is set, a fuel supply control is performed such that a practical speed of a vehicle approaches gently and reasonably to the new aimed speed. That is, it is effective to reasonably control the amount of fuel supply necessary to generate an acceleration torque.

There is a problem that this control must be done by every driver himself as things stand today. That is, it is necessary to educate every driver so as to gently step an accelerator pedal until an aimed vehicle speed is achieved. That is, it is necessary to educate every driver so as not to fully step down an accelerator pedal and release the accelerator pedal after the aimed speed is achieved.

The present inventors have investigated whether the above mentioned problem can be solved by improving the conventional auto-cruising device. That is, it has been investigated whether or not the amount of fuel supply can be controlled such that the acceleration of the vehicle is controlled at a reasonable acceleration even when a driver fully steps down an accelerator pedal rapidly to accelerate a vehicle, unlike the conventional control manner in which the amount of fuel supplied to an engine of the vehicle is directly corresponding to the stepping amount of the accelerator pedal. The conventional auto-cruising device constructed such that the cruising control is actuated manually by the driver becomes meaningless unless the operator actuates the auto-cruising control. However, if the control of the auto-cruising device is automatically actuated simultaneously with a start of an engine of a vehicle in a parking state and the above control for gently increasing an actual fuel flow rate is performed even when the accelerator pedal is fully stepped down by the driver, a starting performance of the vehicle may be degraded.

SUMMARY OF THE INVENTION

The present invention was made in view of the state of art and an object of the present invention is to economize an amount of fuel consumption.

Another object of the present invention is to provide an acceleration control device capable of automatically actuating a control (auto-cruising control) without necessity of any manual operation by a driver.

Another object of the present invention is to provide an acceleration control device capable of preventing a fuel supply to a vehicle engine from being increased rapidly and speed burst of a vehicle from occurring even if an accelerator pedal is abruptly stepped down.

Another object of the present invention is to provide an acceleration control device with which unburned gas is not exhausted even if an accelerator pedal is abruptly stepped down.

Another object of the present invention is to provide an acceleration control device, which, when a change of a displacement of an accelerator pedal is small after the control of the acceleration control device is actuated, maintains a vehicle speed at the time of the change of the displacement of the accelerator pedal, similarly to the conventional auto-cruising device.

Another object of the present invention is to provide an acceleration control device, which, when a displacement of an accelerator pedal is reduced, can control such that a fuel supply amount is immediately reduced correspondingly to the change of the displacement of the accelerator pedal.

Another object of the present invention is to provide an acceleration control device, which does not obstruct the acceleration performance of a vehicle at a start time thereof even when an amount of fuel supply is limited.

Another object of the present invention is to provide an acceleration control device, which can restrict unnecessary fuel supply to a vehicle engine while reducing a feeling of physical disorder as to a reaction to an operation of an accelerator pedal given to a driver.

A first feature of the present invention is an acceleration control device provided in a path for transmitting an output of an acceleration sensor for detecting a displacement of an accelerator pedal to an actuator for controlling an accelerator opening, which comprises means for automatically actuating an auto-cruising control with using, as an aimed speed, a vehicle speed at a time when an actuation condition, which includes a displacement of the accelerator pedal within a predetermined range for a predetermined time period or the vehicle speed within a predetermined range for a predetermined time period and others, is established. A second feature of the present invention is acceleration control means for increasing a vehicle speed when an accelerator pedal is displaced substantially in a state where the acceleration control is actuated by the actuating means, while sequentially updating the aimed speed with every small change of the increasing vehicle speed.

As mentioned above, when there is no substantial change of displacement of the accelerator pedal (or the vehicle speed is kept within the predetermined range), it is determined that the initial acceleration of the vehicle is terminated and the vehicle enters into a regular running state. When this state is detected, the acceleration control device (for performing the auto-cruising control for executing the automatic control by setting an aimed vehicle speed) is automatically actuated. The acceleration control is performed autonomously, without the manual switch operation by a driver: Since the vehicle speed is maintained at the speed when the acceleration control is actuated, the driver does not feel the actuation of the acceleration control device in principle. After the acceleration control device starts its control, the vehicle is not accelerated abruptly even if the accelerator pedal is displaced largely. That is, the acceleration control device executes a reasonable acceleration requiring a small fuel consumption by setting a new aimed vehicle speed fractionally and sequentially updating the aimed speed. Therefore, the vehicle enters into the auto-cruising control state without giving a feeling of physical disorder to the driver and, even if the driver displaces the accelerator pedal abruptly, an excessive fuel is not supplied to the engine and the vehicle is gently and reasonably accelerated. With using such control, the fuel consumption is substantially economized.

In order to avoid a degradation of initial acceleration characteristics of a vehicle at a time when the vehicle starts to run, the control device is actuated at not the time of the start of the vehicle but at a time when the vehicle running becomes the regular state automatically. The automatic shift of control to the auto-cruising control is performed because, when the control is to be actuated by the driver, there may be a case where a driver does not actuate the control device for some reason, so that the running control for economizing the fuel consumption can not be done.

Further, the acceleration control device may includes deceleration control means responsive to a release of an accelerator pedal under the condition that the above mentioned control is actuated for setting an aimed value of a vehicle speed correspondingly to a displacement of the accelerator pedal to immediately decelerate the vehicle. This is because, when the vehicle is decelerated, it is more effective in view of both the driving performance and the economizing of fuel consumption to correspond a new displacement of the accelerator pedal to an aimed control value of a new vehicle speed than to perform a control with small range of vehicle speed change. In the state where the above mentioned control is actuated, it may be possible to make the acceleration control device senseless to a change of displacement of the accelerator pedal within a certain range set for the displacement of the accelerator pedal at that time. With such scheme, a driving corresponding to that utilizing the conventional auto-cruising device becomes possible.

That is, in the acceleration control device provided in a path for transmitting an output of an acceleration sensor for detecting a displacement of an accelerator pedal to an actuator for controlling an opening of an accelerator, the present invention is featured by comprising means for automatically actuating an auto-cruising control with using, as an aimed speed, a vehicle speed at a time when an actuation condition, which includes a displacement of the accelerator pedal within a predetermined range for a predetermined time period or the vehicle speed within a predetermined range for a predetermined time period, is established. Further, the present invention is featured by comprising acceleration control means for increasing the vehicle speed when the accelerator pedal is displaced substantially under the condition that the control is actuated by the acceleration control device, by sequentially updating the aimed value of vehicle speed with every small change of the vehicle speed. It is preferable that the present invention includes deceleration control means for setting an aimed value of a vehicle speed correspondingly to a displacement of the accelerator pedal, when the accelerator pedal is released under the condition that the above mentioned control is actuated, to immediately decelerate the vehicle.

In more detail, the present acceleration control device, which includes means for calculating an aimed accelerator opening $A_c$ on a basis of an information of a displacement $A_m$ of an accelerator pedal and a vehicle speed V and means for outputting a control signal such that a difference a difference $\Delta$ of an accelerator opening $$\Delta = A_m - A_c$$

approaches zero, is featured by comprising actuation means for automatically starting a calculation of the aimed accelerator opening $A_c$ when a usual running state of a vehicle is detected on the basis of an information including the vehicle speed V. Further, it is preferable that the acceleration control device further includes means for calculating the aimed accelerator opening $A_c$ by using a speed difference $\delta$ between a virtual aimed speed $V_t$ and the vehicle speed V $$\delta = V_t - V$$

by sequentially setting the virtual aimed vehicle speed $V_t$ for every small range of change on the basis of the difference $\Delta$ of the accelerator opening and the vehicle speed V, after the acceleration control device is actuated by the actuation means.

It is preferable that the actuation means is supplied, as an input information, the vehicle speed V, the displacement $A_m$, a fuel flow rate F and a gear position $T_m$. Further, the calculation means may include accelerator opening difference detection means for identifying the difference $\Delta$ of the accelerator opening, an aimed acceleration calculating means for obtaining an aimed acceleration $\alpha t$ from an output of the accelerator opening difference detection means, virtual aimed vehicle speed calculation means for obtaining the virtual aimed vehicle speed $V_t$ from the aimed acceleration $\alpha t$ and an initial vehicle speed $V_0$ at an actuation time detected by the actuation means, speed difference calculation means for obtaining the speed difference $\delta$ from the virtual aimed vehicle speed $V_t$ and the vehicle speed V and auto-cruising control means for calculating the aimed accelerator opening $A_c$ from the speed difference $\delta$ and the initial accelerator opening $A_0$ generated by the actuation means.

The actuation means may include means for generating, as a signal for automatically actuating the calculation control, the initial vehicle speed $V_0$ and the accelerator opening $A_0$ at that time. The acceleration opening difference detection means may have a dead zone in a portion in the vicinity of the difference $\Delta$ of the accelerator opening, in which the difference $\Delta$ is zero, the difference $\Delta$ of the accelerator opening in the dead zone being outputted by the acceleration opening difference detection means as always zero.

The aimed acceleration calculation means may include a function $\alpha t = (\Delta, V_t)$ map having the difference $\Delta$ of the accelerator opening and the virtual aimed vehicle speed $V_t$ as variables. The virtual aimed vehicle speed calculation means may include means for calculating the virtual aimed vehicle speed $V_t$ by integrating and adding the aimed acceleration $\alpha t$ obtained from the aimed acceleration calculation means to the initial vehicle speed $V_0$ every certain time. It is preferable that the speed difference $\delta$ is fedback to the aimed acceleration calculation means as an input information thereof. Further, the aimed acceleration calculation means preferably includes means (for preventing an increase of the aimed acceleration when the engine output is full) for restricting a transmission of a new aimed acceleration to a limited value when the speed difference $\delta$ is larger than a predetermined value (when actual vehicle speed is low). The aimed acceleration calculation means preferably includes means for inhibiting a transmission of a new aimed acceleration when the speed difference $\delta$ is negative. The aimed acceleration calculating means preferably includes means for inhibiting a transmission of a new aimed acceleration when an absolute value of the inputted speed difference $\delta$ is larger than a predetermined value (downhill, etc.). This is to prevent an erroneous operation of an integration circuit.

The present acceleration control device may include means for temporarily inhibiting the control of the auto-cruising control means, when the difference $\Delta$ of the accelerator opening has a negative value over a negative side predetermined value, and inputting the displacement information $A_m$ of the accelerator pedal (or a regular function thereof) as an acceleration input of an engine. The negative side predetermined value may be set to a value equal to a lower limit of the dead zone. The present acceleration control device may include means for automatically actuating said actuation means when an absolute value of the difference of accelerator opening becomes smaller than a predetermined value in the state where the control is temporarily inhibited.

The present acceleration control device may include means for temporarily inhibiting the control of the auto-cruising control means in a state where a specific operation is performed by a driver and inputting the accelerator pedal displacement information $A_m$ or a regular function thereof as an acceleration input of the engine. The specific operation may include an operation of a direction indicator (winker) and a displacement of the accelerator pedal larger than a predetermined value. This is to obtain safeness when a running vehicle passes another ahead by temporarily stopping the present speed control until the condition under which the actuation means is automatically operated is established again.

The present acceleration control device preferably includes means for automatically actuating the actuation means when the temporary inhibition of the control is released. The acceleration control device may include means for automatically actuating the actuation means when the running state of the vehicle is under a predetermined condition in the state where the control is temporarily inhibited (for example, when the vehicle becomes a regular running state). It may be possible to construct the acceleration control device such that acceleration or deceleration of a vehicle is possible according to the accelerator pedal under the control by the actuation means and, when the acceleration is performed by the accelerator pedal, a control is executed under an acceleration condition preliminarily set correspondingly to the vehicle speed at that time.

The aimed acceleration calculation means may include means for taking in the accelerator pedal displacement information $A_m$ as the input information and means for temporarily (for example, until the displacement of the accelerator pedal is reduced even slightly) changing the map when a state in which the accelerator pedal displacement information $A_m$ is larger than a predetermined value (for example, exceeds 90%) continues for a time longer than a predetermined time (for example, 5 seconds) to generate a larger aimed acceleration ($\alpha t$, for example, about several times). Although this means is not indispensable for the present invention, it is effective to prevent drivability from being degraded when an emergency acceleration is necessary.

The auto-cruising control means may include means for taking in the accelerator pedal displacement information $A_m$ and means for temporarily increasing a control gain (for example, about twice) when a time-differentiated value of the displacement information $A_m$ of the accelerator pedal exceeds a positive side predetermined value (for example, $dA_m/dt > 20\%/sec$). Although this means is also not indispensable for the present invention, this can provide similar effect to that mentioned above.

According to another aspect of the present invention, a control method for controlling the accelerator control device provided in a path for transmitting an output of an acceleration sensor for detecting a displacement of an accelerator pedal to an actuator for controlling an opening of an accelerator is provided. The control method is featured by automatically actuating an auto-cruising control with using a vehicle speed when an actuation condition including a condition, in which a change of vehicle speed is in a predetermined range for a predetermined time (or change of displacement of the accelerator pedal is within a predetermined range), is established as an aimed vehicle speed to be controlled. It is possible to construct the present invention in such a way that, when the accelerator pedal is displaced substantially in a state where the auto-cruising control is actuated, the vehicle speed is increased by sequentially updating the aimed vehicle speed every small change of the vehicle speed. Further, it is possible to control the vehicle speed when the accelerator pedal is released in the state where the auto-cruising control is started such that the vehicle speed is quickly reduced to an aimed value by setting the aimed value correspondingly to the displacement of the accelerator pedal.

Further, the present device may include means for resetting the means for automatically starting the control to an effective state by turning an engine key switch off and then turning on even when the effect of the means for automatically starting the control is stopped for some reason. The present device may include means for effectively resetting the means for automatically starting the control effectively state after a preliminarily set time even when the effect of the means for automatically starting the control is stopped for some reason. The present device may include means for effectively resetting the means for automatically starting the control effectively even if the effect of the means for automatically starting the control is stopped for some reason when the some reason disappears. The some reason may include a reason caused by an operation of a driver. The present invention may include means for effectively resetting the means for automatically starting the control by an operation of a driver.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
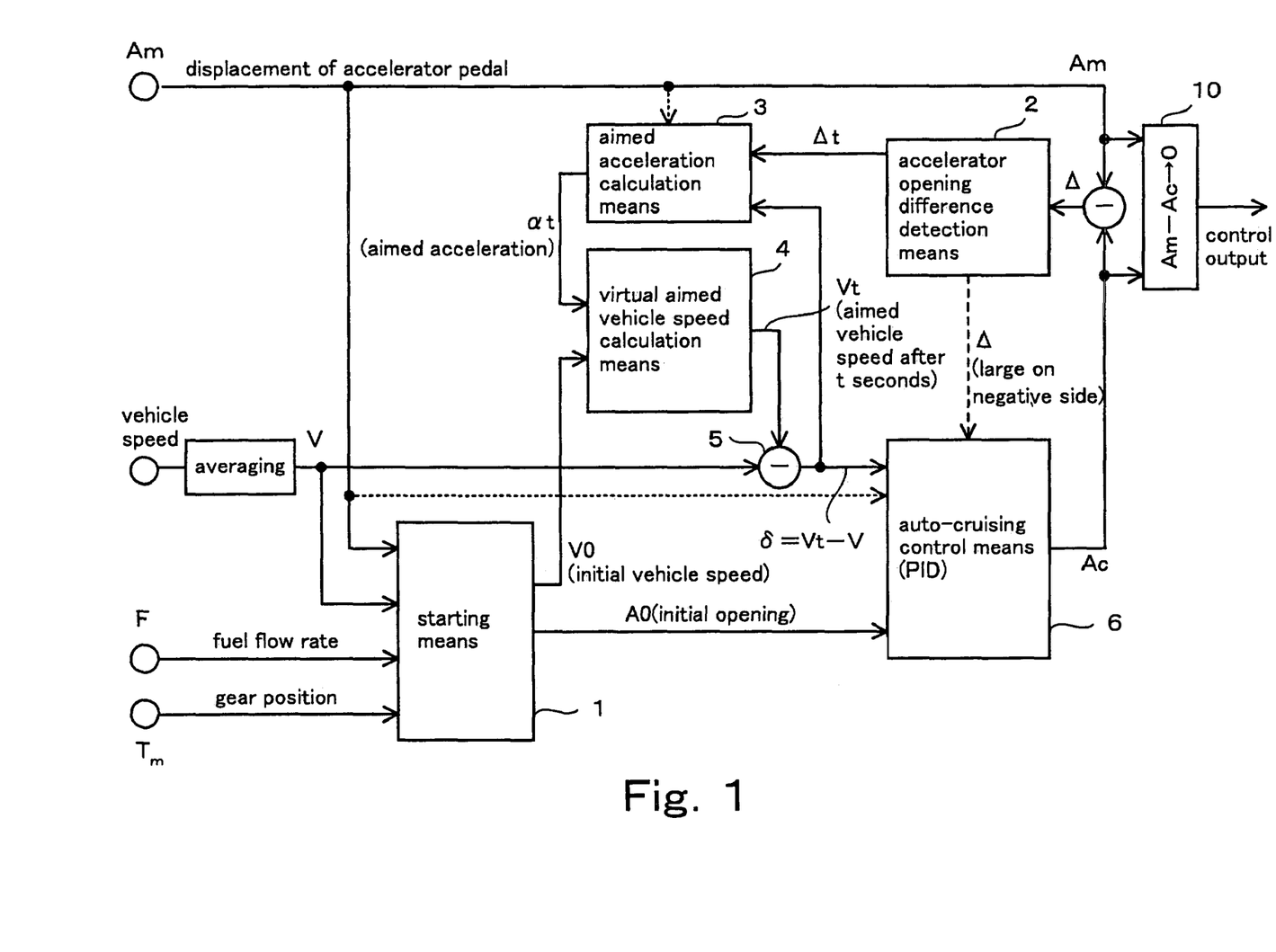
FIG. 1 is a block diagram showing an acceleration control device according to an embodiment of the present invention.

An embodiment of the present invention will be described with reference to the drawings. FIG. 1 is a block diagram showing an acceleration control device according to an embodiment of the present invention. Although the acceleration control device is constructed with a program control circuit including a semiconductor device mounted with a software, the acceleration control device will be described with using the block diagram in order to facilitate a quantitative understanding of a construction and an operation thereof. An input information of this acceleration control device includes a displacement $A_m$ of an accelerator pedal, a vehicle speed V, a fuel flow rate F and a gear position $T_m$. The vehicle speed V is obtained by averaging a signal from a rotary pulse detector circuit provided on a propeller shaft of a vehicle for every short time period (in this embodiment, 1 second). The input information is supplied to the program control circuit through interfaces, which are not shown. The acceleration control device arithmetically operates an aimed opening $A_c$ of a accelerator of an engine of the vehicle on the basis of the input information and outputs a control signal such that an opening difference $\Delta$ of the accelerator $$\Delta = A_m - A_c$$

approaches zero. An output of a difference calculation circuit 10 is sent to an actuator for regulating the accelerator of the engine as a control output of the acceleration control device.

The acceleration control device utilizes a well-known auto-cruising control circuit 6. The auto-cruising control circuit 6 is a so-called PID control circuit (a control circuit for executing a proportional control, an integration control and a differentiation control), calculates the aimed accelerator opening $A_c$ such that a difference $\delta$ between the inputted aimed speed $V_t$ and a current speed V $$\delta = V_t - V$$

becomes small and outputs the aimed accelerator opening as an electric signal.

The acceleration control device of the present invention includes an actuation means 1 for automatically actuating the operation control by detecting from the information including the vehicle speed V that the vehicle is usually cruising on a flat road. The actuation means functions to detect that the vehicle is running on a flat road. That is, by preliminarily setting the vehicle speed to $V \pm \Delta V$ (for example, $60 \pm 10$ km/h), the gear position to n-th speed or higher and the fuel flow rate to f cc/s or smaller as an initial condition, the acceleration control device is actuated by an initial vehicle speed $V_0$ and an initial opening $A_0$ of the accelerator, which are generated when the condition is satisfied for t seconds (for example, several seconds). In the auto-cruising control means 6, the initial accelerator opening $A_0$ becomes an initial value of the opening of the accelerator of the engine.

Figure 2:
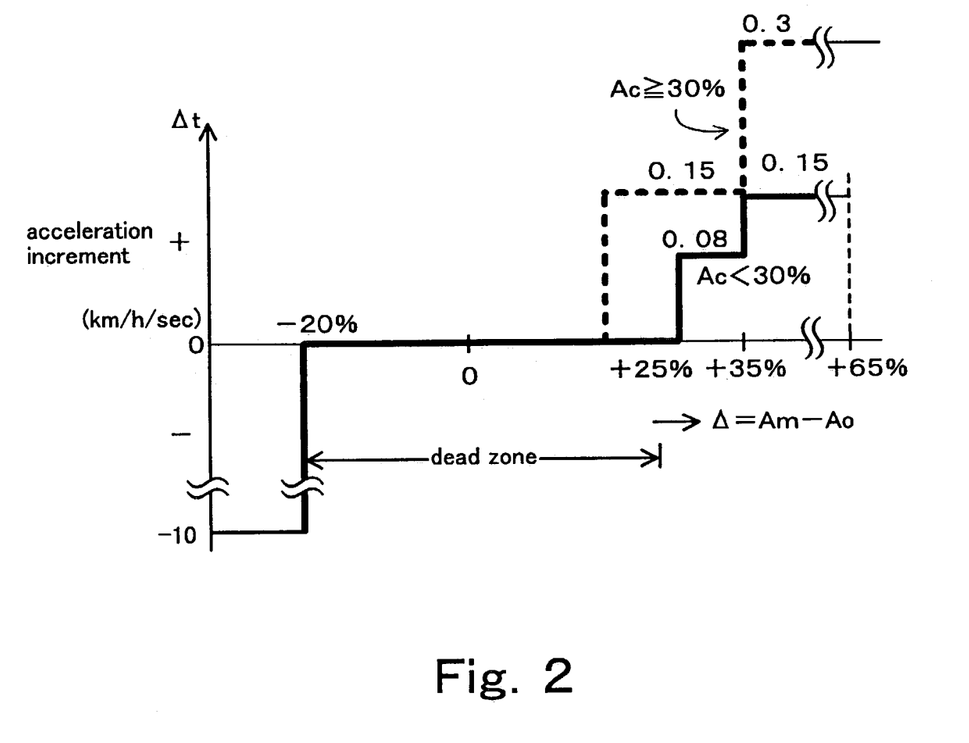
FIG. 2 shows a characteristics of an accelerator opening detection means.

FIG. 2 shows an operation characteristics of the opening difference detection means 2 for detecting an opening difference of the accelerator. The opening difference detection means 2 is inputted with the difference Δ between the current opening $A_m$ of the accelerator and the aimed opening $A_c$, as shown in FIG. 1. This is shown on an abscissa in FIG. 2. The difference Δ is transformed by the opening difference detection means by using a function characteristics shown in FIG. 2 and a resultant transformed difference Δt is outputted. The transformed difference Δt is a value corresponding to an increment of acceleration in [km/h/sec] unit. That is, in this example, a dead zone is set in a range −20%~+25% with a point at which the difference Δ is zero being a center and the difference Δ is deemed as zero in this dead zone. According to this function characteristics, a variation of displacement of the accelerator pedal becomes invalid in a range in which the displacement of the accelerator pedal is small. When the difference Δ exceeds +25%, the transformed difference Δt, which is changed stepwise as shown by a solid line in FIG. 2, is outputted. When the difference Δ is smaller than −20%, a value, which is very large in negative side and, in FIGS. 2, −10, is outputted as the transformed difference Δt.

The basic operation characteristics of the opening difference detection means 2 is shown by the solid line in FIG. 2. The present inventors have conducted experiments by using this basic characteristics. As a result of the experiments, the present inventors have found that, if a payload of the vehicle is large, there is a case where a sufficient acceleration performance can not always obtained. In view of this, the present inventors add a function characteristics shown by a dotted line in FIG. 2 to the basic characteristics. That is, in the present invention, when the aimed accelerator opening $A_c$, which is generated by the auto-cruising control means 6, becomes very large (in this example, +30% or more) under a condition that the vehicle having a large payload climbs an up-hill, the function characteristics shown by the dotted line in FIG. 2 is used temporarily in lieu of the basic function characteristics shown by the solid line in FIG. 2. In this case, the range of the dead zone is slightly reduced and the value of the transformed difference Δt is set slightly larger.

The aimed acceleration calculation means 3 is a map conversion circuit or a numerical table. The aimed acceleration calculation means 3 is inputted with the information of the difference Δ between the current accelerator opening $A_m$ and the aimed accelerator opening $A_c$. In more detail, the transformed difference Δt from the opening difference detection means 2 is inputted to the aimed acceleration calculation means 3. Further, the information of the difference $(V_t-V)$ between the current vehicle speed V and the aimed speed $V_t$ is inputted to the aimed acceleration calculation means 3. From these input information, an aimed acceleration αt is read out from the map conversion table. Polarity of the aimed acceleration αt becomes positive or negative according to polarity of the difference $(V_t-V)$.

The acceleration control device further includes a virtual aimed speed calculation means 4. The virtual aimed speed calculation means 4 is constructed with an integration circuit for calculating the aimed speed $V_t$ after a predetermined time t by integrating the aimed acceleration αt. As an initial integration value, the initial vehicle speed $V_0$ generated by the actuation means 1 is utilized. A difference δ between the aimed speed $V_t$ and the current speed V $$\delta = V_t - V$$

is calculated by a speed difference calculation means (subtractor circuit) 5 and becomes an input information of the auto-cruising control means 6. The speed difference δ is fedback to the input of the aimed acceleration calculation means 3.

In the map conversion circuit provided in the aimed acceleration calculation means 3, the maximum value of the aimed acceleration is limited such that it does not become large on the positive (+) side. Further, the output aimed acceleration αt is limited such that an absolute value of the speed difference δ fedback does not become larger than the set value. This is performed by setting the map as mentioned above. For example, the aimed acceleration αt is set as:

$$-10 < \alpha t < +0.3 \text{ (unit km/h/s)}$$

and the aimed speed $V_t$ is set as:

$$V-2 < V_t < V+2 \text{ (unit km/h)}$$

With such construction, a small aimed acceleration value is outputted from the aimed acceleration calculation means 3 even if the difference between the aimed speed $V_t$ and the current speed V. Therefore, the aimed speed calculated on the basis of this aimed acceleration becomes slightly larger than the current vehicle speed and so the opening of the accelerator becomes small. When the current vehicle speed reaches the aimed speed slightly larger than the current speed, a new aimed acceleration at is outputted from the aimed acceleration calculation means 3 and a similar control is performed such that the current speed becomes the new aimed speed. Therefore, even if the driver tries an abrupt acceleration by stepping down the acceleration pedal abruptly, the acceleration state is limited to execute a gentle and reasonable acceleration by the acceleration control device of the present invention, so that unnecessary consumption of fuel is restricted.

On the other hand, when the displacement of the acceleration pedal is abruptly released during the vehicle is running at a certain speed, the flow rate of fuel supplied to the engine is immediately controlled to a small value. That is, the map of the aimed acceleration calculation means 3 is set such that, in order to immediately follow a displacement of the accelerator pedal, a substantial limitation is not provided on the minus side of acceleration, that is, a deceleration side. Further, in order that the vehicle speed can immediately follow the displacement of the accelerator pedal, a feed-forward circuit from the opening difference detection means 2 to the auto-cruising control means 6 as shown by a dotted line in FIG. 1 may be provided on the deceleration side. With such construction, the engine braking condition is established without increasing the amount of fuel consumption by releasing the accelerator pedal. Therefore, the feeling of driving is not degraded.

Although, in the above description, the actuator means 1 generates the initial vehicle speed $V_0$ and the initial opening $A_0$ when it is actuated, it is preferable to construct the actuator means 1 such that, even after the acceleration control device is actuated once, the values of the initial vehicle speed $V_0$ and the initial opening $A_0$ are updated every time when the conditions set in the actuation means 1 are established. With such construction of the actuator means, it is possible to prevent the integrated output of the virtual aimed speed calculation means 4 from unintentionally drifting.

Further, the acceleration control device of the present invention may include means for temporarily making the control thereof invalid (turning off) by an operation of the driver during a time for which the auto-cruising control is used. The vehicle is not accelerated abruptly even when the driver steps on the accelerator pedal markedly, during the time period for which the auto-cruising control is performed. When, for example, a vehicle runs along a large curve or passes another vehicle by changing a lane, there may be a case where an engine output becomes insufficient. In view of this problem, the device for temporarily invalidating the auto-cruising control of the present invention may be actuated by an operation of a direction indicator. It may be possible to provide means for temporarily inhibiting the control of the auto-cruising control means 6 when the direction indicator is operated to right (or left) and the driver strongly steps on the accelerator pedal over a predetermined amount. The control of the auto-cruising control means 6 may be automatically restored from the inhibited state, when the inhibiting condition disappears. It is possible to construct the acceleration control device such that the control of the auto-cruising control means 6 is automatically restored when the actuation means 1 satisfies the automatic actuation condition in the state where the control is inhibited by the temporarily inhibiting means. When the auto-cruising control is inhibited by either one of the operations of the driver, an engine key switch of the vehicle is turned off at least temporarily. When the key switch is turned on again, a whole history of the temporary inhibition is erased.

Figure 3:
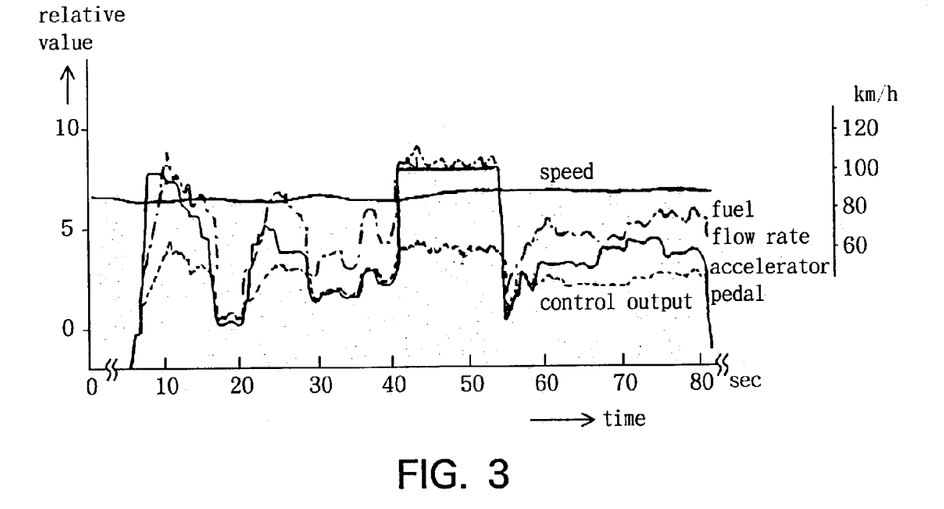
FIG. 3 is a graph showing a variation of an aimed speed according to the acceleration control device according to an embodiment of the present invention.
Figure 4:
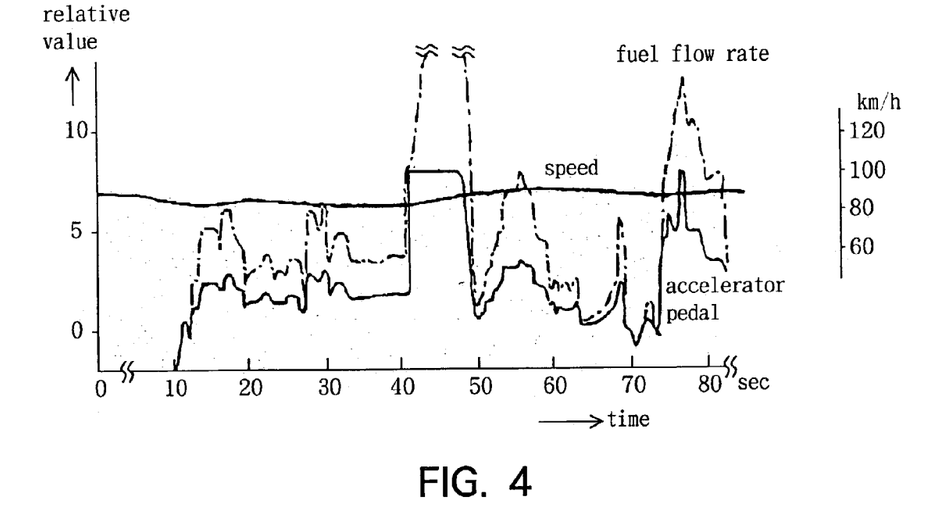
FIG. 4 is a graph showing a variation of an aimed speed according to the acceleration control device without using the control according to an embodiment of the present invention.

Now, examples of a result of one of various tests conducted by the present inventors with using the acceleration control device made on an experimental basis by the present inventors will be described. FIG. 3 shows measured values on the acceleration control device of the present invention and FIG. 4 shows a comparative example of measured values obtained under substantially the same condition as that shown in FIG. 3 by using an acceleration control device without using the control of the present invention. In FIG. 3 and FIG. 4, abscissa indicates a time and ordinate indicates a relative value and scaled from 0 to 10 tentatively. The values were practically measured by running a truck having capacity tonnage of 6 tons and carrying a moderate load along a practical highway road. A test was performed by varying the amount of displacement of the accelerator pedal with period of about 15 seconds while running the vehicle at 90 km/h, which is the maximum of the allowed speed. The vehicle speed practically measured is indicated on a right side scale.

The operation of the accelerator pedal was performed by a driver as shown by a solid line in FIG. 3. In the acceleration control device of the present invention, the displaced amount of the accelerator pedal does not become a control amount of fuel flow rate directly. Instead, the control device is actuated according to the operation of the accelerator pedal and sends a control output shown by the dotted line as an actual opening of the accelerator. A dotted curve is measured values of fuel flow rate (cc/sec unit) supplied to the engine according to this opening of the accelerator.

Paying an attention to a time period from 40 seconds to 55 seconds of the time in abscissa in FIG. 3, the control output of the present device shown by the dotted line is changed when the driver steps on the acceleration pedal very strongly as shown by the solid line. In this case, the control output does not become an extreme value at once. Instead thereof, the acceleration is performed stepwise as mentioned above. That is, although the opening of the accelerator (control output) becomes large, it is controlled to the reasonable value. Therefore, although the fuel flow rate (chain line) also becomes large, it is controlled bit by bit within a small range totally. Looking the time range from 40 seconds to 55 seconds in more detail, it is clear that the fuel is supplied to the engine in such a way that the flow rate thereof is varied bit by bit repeatedly with a period of about 3 seconds, so that the vehicle speed is gently increased.

In the comparative example shown in FIG. 4, in which the present invention is not applied and the displacement of the accelerator pedal becomes the aperture directly, when the accelerator pedal is stepped strongly at the time point of about 40 seconds and maintained at that state (solid line), the fuel flow rate (chain line) is extremely increased correspondingly over a scale of the measuring device used. Although the vehicle speed is increased correspondingly to the increase of the fuel flow rate, the increase of the vehicle speed does not directly correspond to the amount displacement of the accelerator pedal. Therefore, it is clear that the increased fuel supply due to the strong stepping of the accelerator pedal is consumed without utilizing effectively. It is supposed that such excessive fuel is exhausted from an exhaust pipe as black smoke without being effectively burnt.

Figure 5:
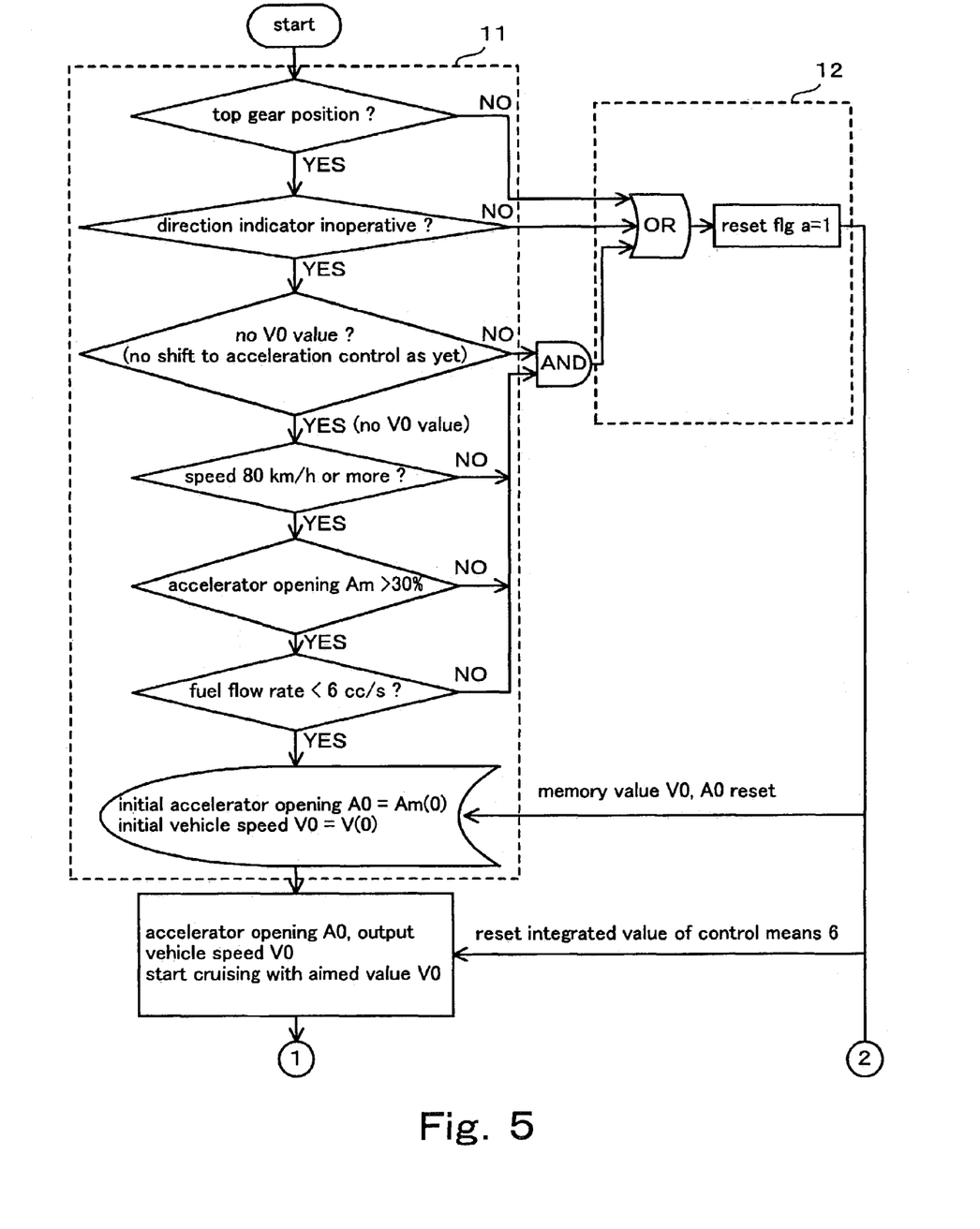
FIG. 5 is a control flowchart for a main portion of the acceleration control device according to an embodiment of the present invention.
Figure 6:
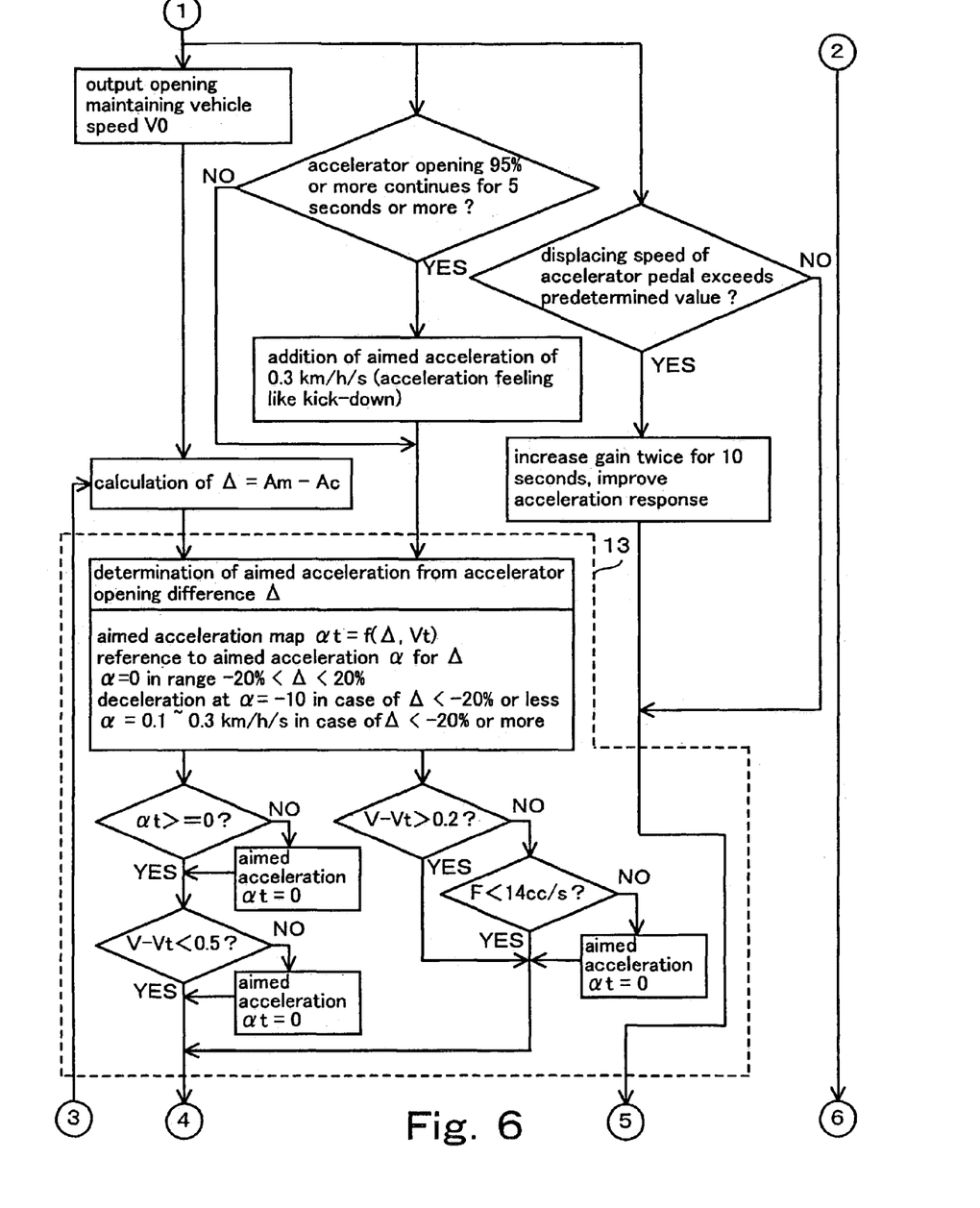
FIG. 6 is a control flowchart for a main portion of the acceleration control device according to an embodiment of the present invention.
Figure 7:
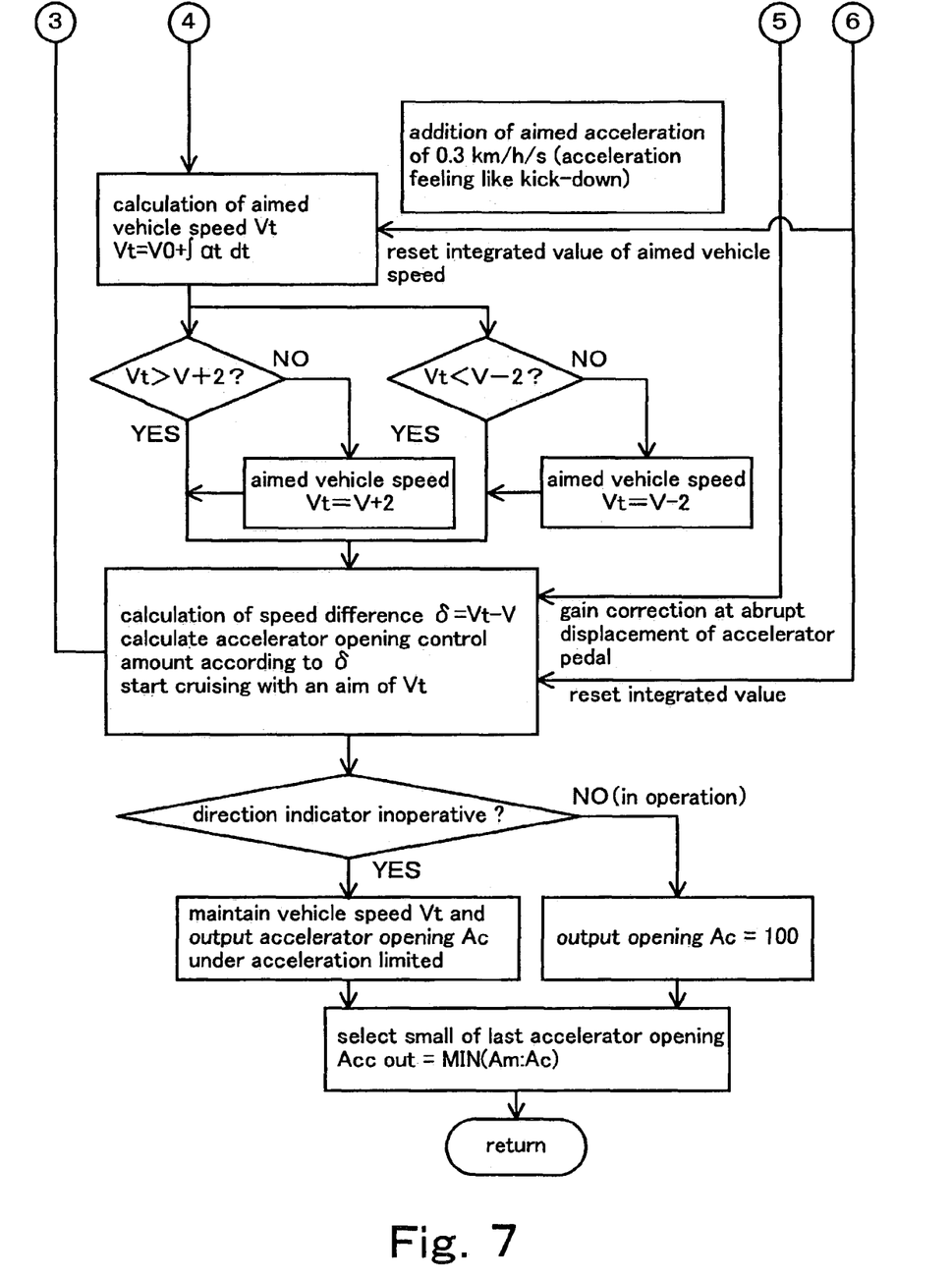
FIG. 7 is a control flowchart for a main portion of the acceleration control device according to an embodiment of the present invention.

FIG. 5 to FIG. 7 shows a control flowchart of the acceleration control device according to the embodiment of the present invention. Lines depicted by numerals (1) and (2) in FIG. 5 are connected to lines depicted by numerals (1) and (2) in FIG. 6, respectively, and lines depicted by numerals (3), (4), (5) and (6) in FIG. 6 are connected to lines depicted by numerals (3), (4), (5) and (6) in FIG. 7, respectively.

A portion indicated by a reference numeral 11 in FIG. 5 is a control portion for automatically actuating the auto-cruising control without any operation of a driver. A portion indicated by a numeral 12 in FIG. 5 shows a logic related to a resetting of parameters for automatically actuating the auto-cruising control. The logic portion 12 functions to rest the integration value in the auto-cruising control means 6 according to an AND logic and an OR logic. A portion depicted by a numeral 13 in FIG. 6 is an operation portion of the aimed acceleration operation means 3. Since the flowchart can be understood by referring to the description already done, details thereof is omitted for avoidance of duplication. By using this flowchart, it is possible to design the program control circuit to which the control logic of the present invention is applied.

According to the present invention, it is possible to restrict the abrupt acceleration of a running vehicle and to economize the fuel consumption. Although the economizing effect must be calculated on the basis of a large number of actual results, at least several percent reduction of fuel consumption can be expected according to the present invention. According to the present invention, it is possible to provide a device with which the auto-cruising control is actuated automatically without any intentional operation of a diver. According to the present invention, it is possible to reasonably increase the vehicle speed even when the accelerator pedal of a running vehicle is strongly stepped down abruptly without excessively increasing the supply of fuel, which can not be burnt. According to the present invention, it is possible to prevent excessive consumption of fuel to thereby reduce non-burnt components contained in exhaust gas. In the present device, the vehicle speed is controlled in such a way that, when the variation of the amount of displacement of the accelerator pedal is small after the auto-cruising control is actuated, the vehicle speed is maintained similarly to the conventional auto-cruising device and, when the accelerator pedal is released, the fuel supply is immediately controlled to a small amount. In the present device, the acceleration performance of the vehicle at the starting time is not degraded even when the supply amount of fuel is limited. The present device does not give a serious feel of disorder for an operation of the acceleration pedal to the driver and can restrict an excessive fuel supply.

What is claimed is:

1. An acceleration control device including means for calculating an aimed accelerator opening $A_c$ on a basis of an information of a displacement amount $A_m$ of an accelerator pedal and a vehicle speed V and means for outputting a control signal such that a difference $\Delta$ of an accelerator opening $$\Delta = A_m - A_c$$

approaches zero, comprising actuation means for automatically starting a calculation of the aimed accelerator opening $A_c$ when a running state of a vehicle is detected on the basis of an information including the vehicle speed V,
wherein an input information of said actuation means for detecting the running state of said vehicle includes, in addition to the vehicle speed V, the displacement amount $A_m$, a fuel flow rate F and a gear position $T_m$.

2. The acceleration control device as claimed in claim 1, further comprising calculation means for calculating the aimed accelerator opening $A_c$ by using a speed difference $\delta$ between a virtual aimed speed $V_t$ and a vehicle speed V $$\delta = V_t - V$$

by sequentially setting the virtual aimed vehicle speed $V_t$ for every small range of change on the basis of the difference $\Delta$ of the accelerator opening and the vehicle speed V.

3. The acceleration control device as claimed in claim 1, wherein said calculation means comprises accelerator opening difference detection means for identifying the difference $\Delta$ of the accelerator opening an aimed acceleration calculating means for obtaining an aimed acceleration $\alpha t$ from an output of said accelerator opening difference detection means, virtual aimed vehicle speed calculation means for obtaining the virtual aimed vehicle speed $V_t$ from the aimed acceleration at and an initial vehicle speed $V_0$ at an actuation time detected by said actuation means, speed difference calculation means for obtaining the speed difference $\delta$ from the virtual aimed vehicle speed $V_t$ and the vehicle speed V and auto-cruising control means for calculating the aimed accelerator opening $A_c$ from the speed difference $\delta$ and the initial accelerator opening $A_0$ generated by said actuation means.

4. The acceleration control device as claimed in claim 3, wherein said actuation means includes means for generating, as a signal for automatically actuating the calculation control, the initial vehicle speed $V_0$ and the accelerator opening $A_0$ at that time.

5. The acceleration control device as claimed in claim 3, wherein said acceleration opening difference detection means has a dead zone in a portion in the vicinity of the difference $\Delta$ of the accelerator opening, in which the difference $\Delta$ is zero, the difference $\Delta$ of the accelerator opening in the dead zone being outputted by said acceleration opening difference detection means as always zero.

6. The acceleration control device as claimed in claim 3, wherein said aimed acceleration calculation means includes a function $\alpha t = (\Delta, V_t)$ map having the difference $\Delta$ of the accelerator opening and the virtual aimed vehicle speed $V_t$ as variables.

7. The acceleration control device as claimed in claim 6, wherein said aimed acceleration calculation means includes means for taking in the accelerator pedal displacement information $A_m$ as the input information and means for temporarily changing said map when a state in which the accelerator pedal displacement information $A_m$ is larger than a predetermined value continues for a time longer than a predetermined time to generate a larger aimed acceleration $\alpha t$.

8. The acceleration control device as claimed in claim 3, wherein said virtual aimed vehicle speed calculation means includes means for calculating the virtual aimed vehicle speed $V_t$ by integrating and adding the aimed acceleration $\alpha t$ obtained from said aimed acceleration calculation means to the initial vehicle speed $V_0$ every certain time.

9. The acceleration control device as claimed in claim 3, wherein the speed difference $\delta$ is fedback to said aimed acceleration calculation means.

10. The acceleration control device as claimed in claim 9, wherein said aimed acceleration calculation means includes means for restricting a transmission of a new aimed acceleration to a limited value when the speed difference $\delta$ is larger than a predetermined value.

11. The acceleration control device as claimed in claim 9, wherein said aimed acceleration calculation means includes means for inhibiting a transmission of a new aimed acceleration when the speed difference $\delta$ is negative.

12. The acceleration control device as claimed in claim 3, further comprising means for temporarily inhibiting the control of said auto-cruising control means, when the difference $\Delta$ of the accelerator opening has a negative value over a negative side predetermined value, and inputting the accelerator pedal displacement information $A_m$ or a regular function thereof as an acceleration input of an engine.

13. The acceleration control device as claimed in claim 12, wherein the negative side predetermined value is set to a value equal to a lower limit of a dead zone, defined by said acceleration opening difference detection means, in a portion in the vicinity of the difference $\Delta$ of the accelerator opening, in which the difference $\Delta$ is zero, the difference $\Delta$ of the accelerator opening in the dead zone being outputted by said acceleration opening difference detection means as always zero.

14. The acceleration control device as claimed in claim 12, further comprising means for automatically actuating said actuation means when an absolute value of the difference of accelerator opening becomes smaller than a predetermined value in the state where the control is temporarily inhibited.

15. The acceleration control device as claimed in claim 3, further comprising means for temporarily inhibiting the control of said auto-cruising control means in a state where a specific operation is performed by a driver and inputting the accelerator pedal displacement information $A_m$ or a regular function thereof as an acceleration input of an engine.

16. The acceleration control device as claimed in claim 15, wherein the specific operation includes an operation of a direction indicator and a stepping of the accelerator pedal deeper than a predetermined value.

17. The acceleration control device as claimed in claim 15, further comprising means for automatically actuating said actuation means when the temporary inhibition of the control is released.

18. The acceleration control device as claimed in claim 15, further comprising means for automatically actuating said actuation means when the running state of said vehicle is under a predetermined condition in the state where the control is temporarily inhibited.

19. The acceleration control device as claimed in claim 3, wherein said auto-cruising control means includes means for taking in the accelerator pedal displacement information $A_m$ and means for temporarily increasing a control gain when a time-differentiated value of the accelerator pedal displacement information $A_m$ exceeds a positive side predetermined value.

* * * * *